US007360628B2

(12) United States Patent
Charvet

(10) Patent No.: US 7,360,628 B2
(45) Date of Patent: Apr. 22, 2008

(54) LIFT TRUCK FOR TIRES WITH MECHANICAL MEANS OF GRIPPING AND TRANSPORTING A VERTICALLY DIVIDED LOAD FOR BETTER VISIBILITY

(75) Inventor: Paul Charvet, Veyre-Monton (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 124 days.

(21) Appl. No.: 10/778,927

(22) Filed: Feb. 13, 2004

(65) Prior Publication Data

US 2004/0265106 A1 Dec. 30, 2004

(30) Foreign Application Priority Data

Feb. 13, 2003 (FR) .................................. 03 01864

(51) Int. Cl.
*B65G 1/00* (2006.01)

(52) U.S. Cl. ...................... 187/237; 187/249; 414/623

(58) Field of Classification Search ................ 414/635, 414/785, 623; 187/249, 237
See application file for complete search history.

(56) References Cited

U.S. PATENT DOCUMENTS

| | | | | |
|---|---|---|---|---|
| 2,948,428 A | * | 8/1960 | Kughler | 414/621 |
| 3,045,850 A | * | 7/1962 | Carr et al. | 414/607 |
| 3,187,917 A | * | 6/1965 | Miller | 414/664 |
| 3,866,780 A | * | 2/1975 | Miller et al. | 414/623 |
| 3,970,342 A | | 7/1976 | Cotton | |
| 5,215,427 A | * | 6/1993 | Olsthoorn et al. | 414/664 |
| 5,385,440 A | | 1/1995 | Raben | |
| 5,562,386 A | * | 10/1996 | Browning | 414/408 |
| 6,135,704 A | * | 10/2000 | Seaberg | 414/791.6 |

FOREIGN PATENT DOCUMENTS

| | | |
|---|---|---|
| BE | 636171 | 12/1963 |
| DE | 195 37 300 A1 | 10/1995 |
| DE | 100 02 846 A1 | 1/2000 |
| DE | 101 27 949 C2 | 6/2001 |
| FR | 1.285.165 | 1/1962 |
| JP | 06-298497 | 10/1994 |
| JP | 10-310392 | 11/1998 |
| JP | 2002-060192 | 2/2002 |
| NL | 10080028 | 9/1999 |

* cited by examiner

*Primary Examiner*—Charles A. Fox
(74) *Attorney, Agent, or Firm*—Cohen Pontani Lieberman & Pavane LLP

(57) ABSTRACT

A "forward facing" lift truck (1) for transporting a vertical stack (2) of tires (3) located in front of the lift truck. The lift truck includes grasping means (4) mounted on the frame or "mast" (11) of the lift truck and adapted for picking up and dividing the stack vertically into two vertical, so-called "upper" (2H) and "lower" (2B) sections, so as to open up a space (E) between the two "upper" and "lower" sections of the stack. This space is created at a height above the floor such that the field of vision (CV) of the lift truck driver (or operator) passes through this space at an angle such that the operator can see the floor in front of the lift truck, at a predetermined "safe" distance (D) and beyond, and also has a distant view.

11 Claims, 3 Drawing Sheets

LIFT TRUCK FOR TIRES WITH MECHANICAL MEANS OF GRIPPING AND TRANSPORTING A VERTICALLY DIVIDED LOAD FOR BETTER VISIBILITY

FIELD OF THE INVENTION

The present invention concerns the technical sector of the transportation and storage of tires, and more precisely the technical field of lift trucks adapted for operations for transporting stacks of tires over short distances, for example between two storage areas in a shop, or between the end of the production line and a storage area, and similar routes.

Hereinafter, a "stack" of tires means a set of tires placed on top of one another with their axes of symmetry roughly aligned and oriented vertically for vertical stacks, and placed against one another with their axes of symmetry roughly aligned and oriented horizontally for horizontal stacks.

BACKGROUND OF THE INVENTION

There are known lift trucks for transporting stacks of tires that include a very long arm capable, in the horizontal position, of being inserted through the center of a horizontal stack of tires, and of picking up this stack with a subsequent vertical pivoting of the arm carrying the horizontal stack, so that the stack is vertical for transport.

It is understood that, in such a configuration, the stack of tires completely blocks the driver's field of vision in the truck's line of travel, forcing the operator to lean over or turn around (ergonomic problems) or to open up his field of vision by driving in a more or less "meandering" motion, which is not entirely safe. Often, if the width of the load is too large, the operator is forced to drive the vehicle in reverse, turning himself around ("rear facing" position). All of these stopgap measures are dangerous and/or pose serious ergonomic problems and fatigue.

The document DE 101 27 949 C2 discloses a pallet lift truck comprising two sets of two forks, each made to carry a pallet of merchandise, such that between the two pallets, in operation, a viewing space can be provided for the operator. But this truck cannot be used to transport stacks of tires.

There is therefore an important and recognized need for a lift truck that would make it possible to transport, load, unload, and perform other similar operations on stacks of tires with the operator in the "forward facing" position, and that would provide the operator with good visibility in the truck's longitudinal direction of travel and in a certain useful angle on each side of this longitudinal direction.

Naturally, such a truck should not include any mechanical means that might damage the tires, for example by excessive deformation, or even simply leave marks on their treads or sidewalls, which may cause the customer to return the tires on receipt.

Moreover, it would be interesting to link these advantages to an increase in productivity, i.e. in the number of tires transported per time unit over a given route. In this respect, the limits are currently reached quickly due to the fatigue associated with the operator's poor driving position.

It is therefore clear that the problem of safety and fatigue is linked to that of increasing productivity.

Hereinafter, "vertical" stacks designate vertical or roughly vertical stacks, the stacks of tires not necessarily being absolutely vertical. As a general rule, they are practically so, but a few degrees of inclination will not affect the invention. A larger inclination would not affect the use of the invention either, but would encounter problems with larger overhang and wasted space due to the inclination of the bottom tire. Except in the particular case of a very low shop ceiling, these situations are unlikely. Hereinafter, only the term "vertical" will be used, it being emphasized that this term covers the above options.

"Safe distance" designates herein the distance in front of the truck, i.e. in its direction of travel, beyond which it is reasonably necessary for the operator's field of vision to include a view of the floor so that for example he can stop safely if he detects an obstacle, and inside of which, when the truck is in continuous motion—i.e. not in the start or restart phase—at a normal speed, it is not necessary for the operator's field of vision to include the floor. It is understood that this simple term denotes the fact that on startup, and with each restart, the operator must verify that there are no obstacles inside of the safe distance—this is essential—but that, in continuous forward motion, the field of vision will make it possible to "scan" the floor and the space ahead of the truck from said "safe" distance forward.

Moreover, "horizontal" designates the direction perpendicular to the vertical direction. Naturally, the terms "vertical" and "horizontal" include the directions that are not exactly vertical or horizontal but close enough to these directions not to affect the balance of the vehicle.

"Upper" designates the upper part of the stack and the various elements of the truck, and "lower" designates the lower part.

"Internal" or "inner" designates the space located between the grasping means of a handling truck, particularly forks and clamps and arms, or the faces of certain elements turned or directed toward the "internal" space.

"Front" designates anything at the front of the truck, or in front of the truck, or the face of an element turned or directed toward the "front"

"Mast" designates the vertical fastening or guide elements mounted on any truck of the type in question, and capable of receiving, in a known way, loading means attached to guide carriages that can be height-adjusted on said "mast." The mast has the reference 11 in the attached drawings.

SUMMARY OF THE INVENTION

One aspect of the invention is directed to a "forward facing" truck for transporting a vertical stack of tires located in front of the truck, which includes grasping means mounted on the mast of the truck and adapted for picking up and dividing the stack vertically into two vertical or roughly vertical so-called "upper" and "lower" sections, so as to open up a space E between the two "upper" and "lower" sections of said stack, each of the upper section and the lower section including a plurality of the tires, this space being created at a floor height such that the field of vision CV of the lift truck driver (or operator) passes through this space at an angle such that said operator can see the floor in front of the truck at a so-called "safe" distance D and beyond, and also has a distant view.

In a preferred embodiment, the grasping means includes:

- at least two upper and lower pairs of respective lower and upper vertical clamps, movable horizontally so as to be able to produce a tightening or loosening movement between them, and with an internal geometry G that is adapted so as to roughly fit the contour of the tread of a tire placed horizontally between them, and attached by respective upper and lower arms to the mast or frame via respective upper and lower guide carriages, mounted so as to slide vertically on the frame or mast and capable of sliding up and down on the frame, and independent means for command and control of the sliding of the respective upper and lower guide carriages, and of the horizontal separation between the pairs of respective upper and lower clamps.

"Roughly fit" denotes the fact that the geometry is adapted so that when the clamps are pressed against the tread of a tire placed between them, the clamps can tighten enough to move the two upper and lower sections of the stack of tires vertically, without having this tightening deform or "mark" the tread of the tire.

In one option, the clamps are each constituted by two, or more than two, parts articulated to one another so as to fit even more tightly against the tread of the tire. This option will be understandable to one skilled in the art based on known rules of geometry and kinematics and will not be described in further detail.

In another option, the clamps make more of an angular and/or lateral movement, i.e. the guide carriages can also be moved laterally, horizontally, relative to the mast of the truck, so as to shift the pairs of clamps to the right or the left, and/or angularly, i.e. the clamps are attached to the guide carriages by an additional means comprising a pivot located on the longitudinal axis of symmetry (or on this same axis "offset" when the pairs of clamps are shifted to the right or the left) and mechanical means that make it possible to angularly orient the pairs of clamps relative to the longitudinal axis of the truck.

In a particular embodiment, said upper and lower clamps are articulated in rotation around a vertical axis integral with the upper and lower arms, for a better adaptation to the contour of the tire.

The purpose of these angular and/or lateral arrangements is to facilitate the grasping of tires stored in hard-to-reach places. Naturally, the amplitude of the lateral and/or angular movements must be compatible with the stability of the vehicle.

In a particular embodiment, the lift truck according to the invention includes means for synchronizing the movements of the pairs of upper and lower clamps. In a nonlimiting option, a vertical pin is used for the mechanical synchronization of the clamps and is housed in a space provided in the upper and lower guide carriages. This pin ensures an identical distance between the upper and lower clamps, even in the presence of a slight error in the adjustment of clamp control elements such as hydraulic jacks, for example.

It is also possible to provide for the internal faces of the clamps and possibly of the arms to be made of, or covered with, a flexible rubber-like material or another material capable of protecting the tire while tightly fitting its contour.

In a particular embodiment, said tightening/loosening movement produced by said upper and lower clamps, or the horizontal separation, is obtained by sliding the upper and lower guide carriages horizontally on the frame.

According to yet another embodiment, said movement is obtained by elements of said arms rotating horizontally around a vertical axis integral with the upper and lower guide carriages.

Said command and control means are of a type well known to one skilled in the art, including jacks, electric motors, hydraulic or electrical controls, and possibly servomotors, the various movements being controllable by the operator separately from one another; said command and control means also include, in a preferred embodiment, well known safety devices such as position sensors, sensors of contact pressure with the tires, anti-crush systems (particularly in the space E), anti-rock, anti-rollover and similar systems for the truck, capable when a threshold is crossed of activating an alarm and if necessary of stopping the movement. The entire assembly is preferably controlled by an on-board electronic device of the known type whose thresholds can be preprogrammed but are modifiable by means of an embedded program that can allow certain adjustments based on, for example, the number and type of the tires and similar parameters.

In a particular embodiment, the assembly formed by the frame or mast and the grasping means can be mounted so as to pivot around a horizontal axis integral with the truck and located in front of the latter, so that this assembly is capable of picking up a horizontal stack of tires, and then raising it into a vertical position (the division according to the invention being produced subsequently).

The invention also concerns the method for transporting a vertical stack of tires on a lift truck, in front of this truck, with the lift truck operator in a "straight forward facing" position, in which said vertical stack is divided into two upper and lower sections so as to open up a space E between the two "upper" and "lower" sections of the stack, this space being created at a height above the floor such that the field of vision CV of the lift truck driver (or operator) passes through this space at an angle such that said operator can see the floor in front of the truck, at a predetermined "safe" distance D and beyond, and also has a distant view.

Preferably, the tires transported in stacks are tires for heavy-duty vehicles. Tires for heavy-duty vehicles actually have a diameter large enough for stacks of 7 to 11 tires to be quite stable.

Transporting heavy-duty tires with the lift trucks according to the invention has the advantage of requiring far less space than transporting the usual pallets with fork lift trucks (by a factor of 2 to 2.5 depending on the dimensions). It is therefore possible to reduce the width of the traffic aisles in warehouses and to increase the storage density of the tires. It is thus possible to gain up to 30% in storage surface area.

BRIEF DESCRIPTION OF THE DRAWINGS

Other characteristics and advantages of the invention will be better understood by reading the description below, and by referring to the attached drawing in which.

DETAILED DESCRIPTION OF THE DRAWINGS

Figure 1:
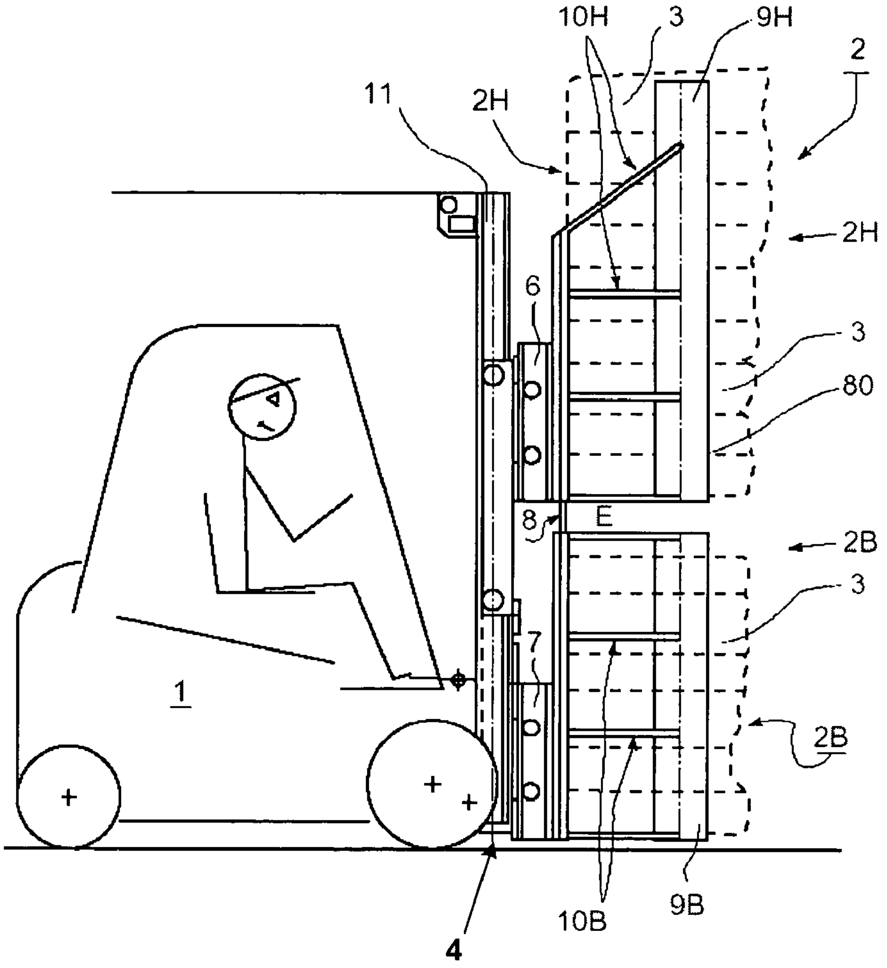
FIG. 1 represents a schematic side view of the lift truck according to the invention FIG. 2 which is composed of FIGS. 2A and 2B, schematically represents, in a upper view, the grasping means of the truck in FIG. 1.

FIG. 1 presents, in a schematic side view, a lift truck 1 according to the invention. This "forward facing" truck 1 for transporting a vertical stack 2 of tires 3, located in front of the truck, includes grasping means 4 mounted on the "mast" 11 of the truck and adapted for picking up and dividing said stack vertically into two vertical, or roughly vertical, so-called "upper" 2H and "lower" 2B sections, so as to open up a space E between the two "upper" and "lower" sections of said stack, this space being created at a height above the floor such that the field of vision CV of the lift truck driver (or operator) passes through this space at an angle such that said operator can see the floor in front of the truck, at a predetermined "safe" distance D and beyond, and also has a distant view.

The grasping means 4 includes:

two upper and lower pairs of respective lower 9B and upper 9H vertical (when the truck is loaded) clamps, horizontally movable so as to be able to produce a tightening or loosening movement between them, and with an internal geometry G that is adapted so as to roughly fit the contour of the tread of a tire placed horizontally between them, and attached by respective upper and lower arms 10H, 10B to the frame or mast 11 via respective (upper) 6 and (lower) 7 guide carriages, mounted so as to slide vertically on said frame or mast 11 and capable of sliding up and down on the frame, and independent means for command and control of said sliding of said respective guide carriages 6 and 7, and of the horizontal separation between the pairs of respective clamps 9H and 9B.

In FIG. 1, we also see the vertical pin 8 that is used for the mechanical synchronization of the clamps and is housed in a space provided in the guide carriages 6 and 7.

Figures 2, 2A, 2B:
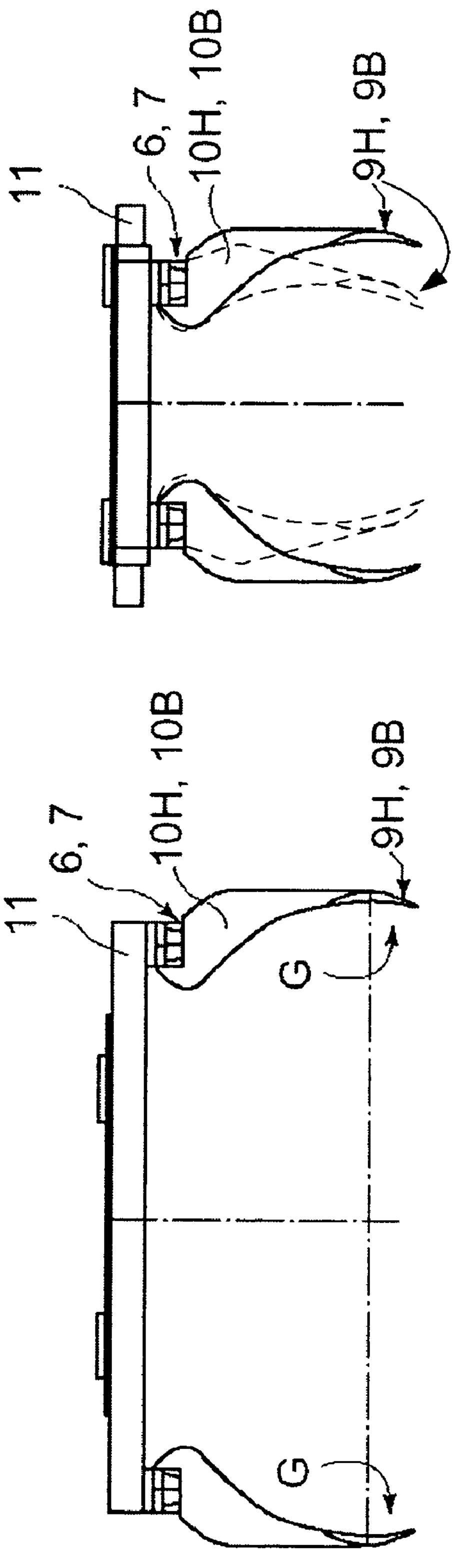

In FIGS. 2A and 2B, we see in a schematic upper view the pair of upper 9H (or respectively lower 9B) clamps, the arms 10H (or respectively 10B) for fastening the clamps to the upper 6 (or respectively lower 7) guide carriages, and the frame or mast 11. In this non-limiting embodiment, we see that the guide carriages 6, 7 slide horizontally on the frame or mast 11, from an open position—FIG. 2A—to a tightened position—FIG. 2B—and vice versa. FIG. 2B also shows that the arms 10H, 10B can rotate horizontally around a vertical axis integral with the guide carriages 6, 7 to an alternate, tightened position, and vice versa. We see that, in a particular and non-limiting embodiment, the internal geometry of the arms 10H, 10B is also adapted to fit the contour of the tread of the tires placed between the assembly formed by said respective clamps 9H and 9B, and said respective arms 10H and 10B.

Figure 3:
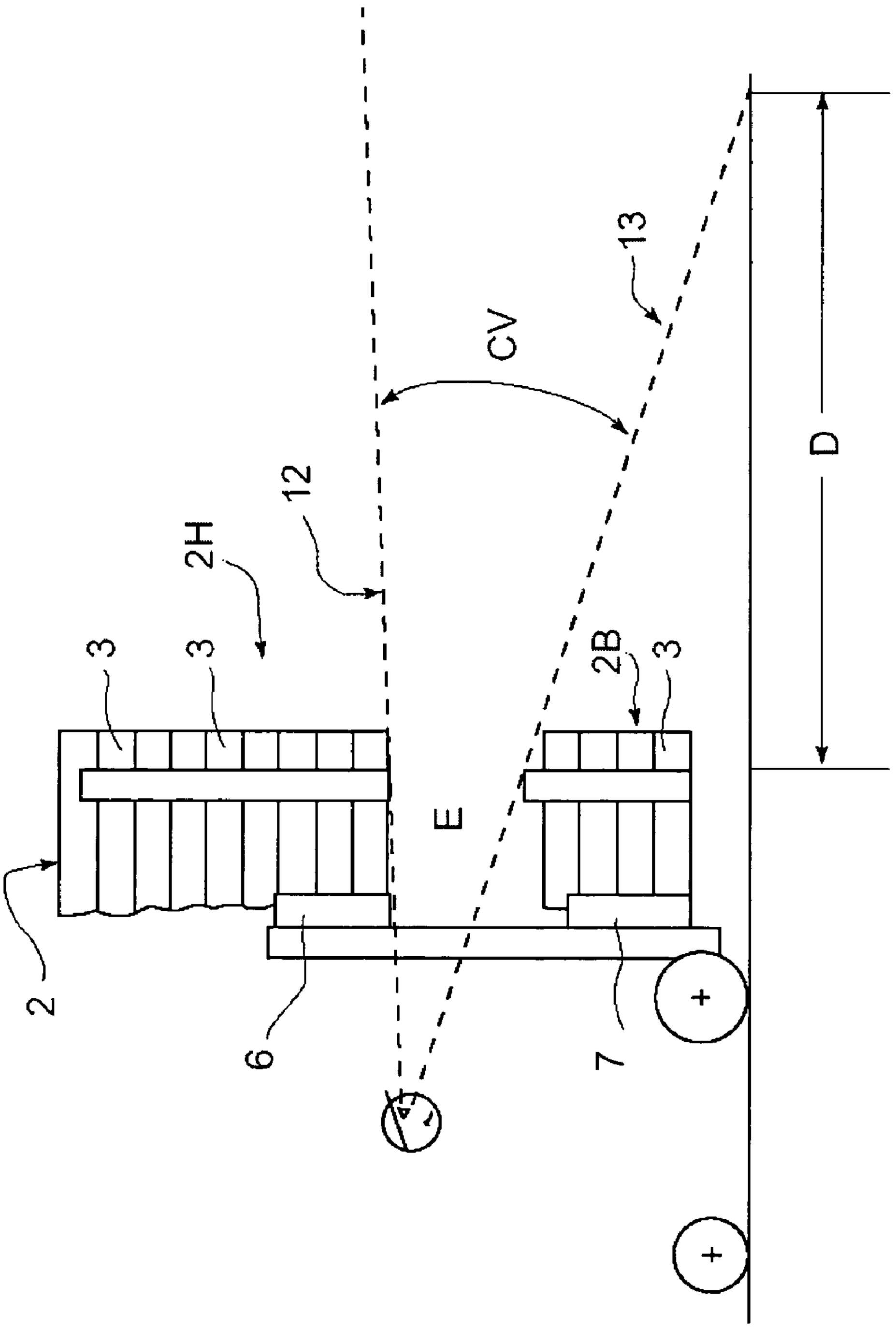
FIG. 3 schematically represents a side view of the lift truck according to the invention, in the traveling position.

FIG. 3 schematically presents a side view of the lift truck according to the invention in the traveling position. We see that, after the loading of the stack of tires, the clamp/arm assemblies have been tightened so as to hold the tires in place and to be capable of lifting the upper stack 2H to a height above the floor such that the space E created between the stacks 2B and 2H delimits a field of vision CV whose upper edge 12 allows a distant view. The height above the floor at which the division of the stack 2 is produced is calculated so that the lower edge 13 of the field of vision blocks the floor in front of the truck at a distance that is no greater than the safe distance D.

This safe distance can naturally be varied based on numerous parameters, including the speed of travel, but the invention makes it possible to locate it, for example, and naturally in an absolutely non-limiting way, 7 m away from the operator, or about 5 m in front of the front end of the stack of tires. This distance on the order of 5 m is such that it becomes highly unlikely that an obstacle would have time to suddenly appear in front of the truck. This value is naturally non-limiting, and the safe distance will be a compromise between the opening of the forward field of vision and the stability of the vehicle.

One skilled in the art will understand that, if the stack of tires were placed at the rear of the truck, assuming that the truck were adapted to this novel mode of overhang, what has been described above would apply mutatis mutandis and would be useful for maneuvering in reverse or in reverse at an angle. The invention therefore also covers these options.

The invention also covers all of the embodiments and applications that would be directly within reach of one skilled in the art through the reading of the present application, through his own expertise, and possibly through simple routine tests.

I claim:

1. A forward facing lift truck for transporting a vertical stack of tires located in front of the lift truck, the lift truck comprising:

grasping means mounted on a frame of the lift truck and comprising a pair of upper vertical clamps and a pair of lower vertical clamps, said grasping means being adapted for grasping all of the tires of the stack only by pressing horizontally said vertical clamps against circumferences of treads of all of the tires of the stack, picking up and dividing the stack vertically into a vertical upper section and a vertical lower section, so as to open up a space between the vertical upper section and the vertical lower section, each of the vertical upper section and the vertical lower section comprising a plurality of the tires, wherein this space is created at a height above the floor such that a field of vision of an operator of the lift truck passes through this space at an angle such that the operator can see the floor in front of the lift truck, at a predetermined safe distance and beyond, and also has a distant view.

2. The lift truck according to claim 1, wherein the upper or lower vertical clamps are movable horizontally so as to be able to produce a tightening or loosening movement therebetween, the upper or lower vertical clamps having an internal geometry which is adapted so as to roughly fit the circumference of the tread of a tire placed horizontally therebetween, the upper and lower vertical clamps being attached by respective upper and lower arms to said frame via respective upper and lower guide carriages which are mounted so as to slide vertically on said frame and capable of sliding up and down on said frame, and wherein said grasping means further comprises independent means for command and control of said sliding of said respective upper and lower guide carriages, and of the horizontal separation between the upper vertical clamps or the lower vertical clamps.

3. The lift truck according to claim 2, wherein the upper or lower vertical clamps comprise two parts articulated to one another so as to fit even more tightly against the circumference of the tread of the tire.

4. The lift truck according to claim 2, wherein said upper or lower vertical clamps are articulated in rotation around a vertical axis integral with the respective arms, for a better adaptation to the circumference of the tread of the tire.

5. The lift truck according to claim 2, wherein internal faces of at least ones of the upper and lower vertical clamps and the arms are made of, or covered with, a flexible rubber-like material or another material capable of protecting a tire placed horizontally between the upper or lower vertical clamps while tightly fitting the circumference of the tread of the tire.

6. The lift truck according to claim 2, wherein said tightening or loosening movement is obtained by elements of said arms rotating horizontally around a vertical axis integral with the guide carriages.

7. The lift truck according to claim 1, further comprising means for synchronizing movements of the pairs of upper and lower vertical clamps, possibly controlled by a pre-programmable on-board electronic device.

8. The lift truck according to claim 7, further comprising a vertical pin which is used as a means for mechanically synchronizing the upper and lower vertical clamps and is housed in a space provided between the upper and lower guide carriages.

9. The lift truck according to claim 1, wherein the grasping means is adapted for transporting heavy-duty tires.

10. A method for transporting a vertical stack of tires on a lift truck, in front of this lift truck or behind this lift truck, with an operator of the lift truck in a straight forward facing position, wherein the method comprises the steps of:

grasping all of the tires of the stack only by pressing horizontally clamps of a pair of upper vertical clamps and a pair of lower vertical clamps against circumferences of treads of all of the tires of the stack;

dividing the stack of tires on this lift truck into an upper section and a lower section so as to open up a space between the upper section and the lower section, each of the upper section and the lower section comprising a plurality of the tires, and creating this space at a height above the floor such that a field of vision of the operator passes through this space at an angle such that the operator can see the floor in front of the lift truck, at a predetermined safe distance and beyond, and also has a distant view.

11. A forward facing lift truck for transporting a vertical stack of tires located in front of the lift truck, the lift truck comprising:

grasping means mounted on a frame of the lift truck and comprising a pair of upper vertical clamps and a pair of lower vertical clamps, said grasping means being adapted for grasping all of the tires of the stack by pressing horizontally said vertical clamps against circumferences of treads of all of the tires of the stack, picking up and dividing the stack vertically into a vertical upper section and a vertical lower section, so as to open up a space between the vertical upper section and the vertical lower section, each of the vertical upper section and the vertical lower section comprising a plurality of the tires, wherein this space is created at a height above the floor such that a field of vision of an operator of the lift truck passes through this space at an angle such that the operator can see the floor in front of the lift truck, at a predetermined safe distance and beyond, and also has a distant view.

* * * * *